US008920762B2

(12) United States Patent
Hashimoto

(10) Patent No.: US 8,920,762 B2
(45) Date of Patent: Dec. 30, 2014

(54) SYNTHESIS METHOD OF TRANSITION METAL NITRIDE AND TRANSITION METAL NITRIDE

(75) Inventor: Tadao Hashimoto, Santa Barbara, CA (US)

(73) Assignee: SixPoint Materials, Inc., Buellton, CA (US)

( * ) Notice: Subject to any disclaimer, the term of this patent is extended or adjusted under 35 U.S.C. 154(b) by 114 days.

(21) Appl. No.: 13/524,399

(22) Filed: Jun. 15, 2012

(65) Prior Publication Data

US 2012/0328883 A1    Dec. 27, 2012

Related U.S. Application Data

(60) Provisional application No. 61/501,656, filed on Jun. 27, 2011, provisional application No. 61/505,758, filed on Jul. 8, 2011.

(51) Int. Cl.
| | | |
|---|---|---|
| C01B 21/06 | (2006.01) | |
| C01B 21/076 | (2006.01) | |
| H01G 11/30 | (2013.01) | |
| H01G 9/042 | (2006.01) | |
| H01G 9/04 | (2006.01) | |
| H01G 11/50 | (2013.01) | |

(52) U.S. Cl.
CPC .......... *H01G 11/30* (2013.01); *C01B 21/0615* (2013.01); *C01B 21/0617* (2013.01); *H01G 9/042* (2013.01); *H01G 9/058* (2013.01); *H01G 11/50* (2013.01); *C01P 2004/64* (2013.01); *C01P 2006/12* (2013.01); *Y02T 10/7022* (2013.01); *Y02E 60/13* (2013.01)
USPC .......................................... 423/409; 423/411

(58) Field of Classification Search
USPC .................................................. 423/409, 411
See application file for complete search history.

(56) References Cited

U.S. PATENT DOCUMENTS

| | | | | |
|---|---|---|---|---|
| 4,196,178 A | * | 4/1980 | Iwai et al. ..................... | 423/290 |
| 4,515,763 A | * | 5/1985 | Boudart et al. ............... | 423/409 |
| 4,851,206 A | | 7/1989 | Boudart | |
| 5,680,292 A | * | 10/1997 | Thompson et al. .......... | 361/528 |

(Continued)

FOREIGN PATENT DOCUMENTS

| | | |
|---|---|---|
| CN | 101061570 A | 10/2007 |
| EP | 1041610 A1 | 10/2000 |

(Continued)

OTHER PUBLICATIONS

Desmoulins-Krawiec, Sophie et al, "Synthesis of nanostructured materials in supercritical ammonia: nitrides, metals and oxides", Journal of Materials Chemistry (2004), 14 (2), 228-232.*

(Continued)

*Primary Examiner* — Wayne Langel
(74) *Attorney, Agent, or Firm* — K&L Gates LLP

(57) ABSTRACT

The present invention discloses a method of synthesizing transition metal nitride by using supercritical ammonia. Transition metal nitride such as vanadium nitride, molybdenum nitride, titanium nitride, nickel nitride, neodymium nitride, iron nitride, etc. can be synthesized in supercritical ammonia with reducing mineralizers such as potassium, sodium, lithium, magnesium, calcium, and aluminum. Since supercritical ammonia has characteristics of both gas and liquid, it can over complicated fine structure or fine particles. The new method is suitable for forming a protective coating on complicated structure or forming micro- to nano-sized particles.

17 Claims, 2 Drawing Sheets

(56) References Cited

U.S. PATENT DOCUMENTS

| | | | |
|---|---|---|---|
| 6,168,694 B1* | 1/2001 | Huang et al. | 204/290.12 |
| 6,743,947 B1 | 6/2004 | Xu et al. | |
| 2007/0234946 A1 | 10/2007 | Hashimoto et al. | |
| 2010/0019207 A1 | 1/2010 | Kumta et al. | |
| 2010/0195269 A1 | 8/2010 | Kim | |
| 2012/0262842 A1* | 10/2012 | Thompson et al. | 361/502 |
| 2012/0327559 A1 | 12/2012 | Hashimoto | |

FOREIGN PATENT DOCUMENTS

| | | |
|---|---|---|
| EP | 2723680 | 4/2014 |
| EP | 2724356 | 4/2014 |
| WO | WO96/19003 A1 | 6/1996 |
| WO | WO03/035945 A2 | 5/2003 |
| WO | WO2004/003261 A1 | 1/2004 |
| WO | WO2004/053206 A1 | 6/2004 |
| WO | WO2004/061923 A1 | 7/2004 |
| WO | WO2007/008198 A1 | 1/2007 |
| WO | WO2007/078844 A2 | 7/2007 |
| WO | WO2007/117689 A2 | 10/2007 |
| WO | WO2007/149487 A2 | 12/2007 |
| WO | WO2009/155043 A1 | 12/2009 |
| WO | WO2013/003073 | 1/2013 |
| WO | WO2013/003074 | 1/2013 |

OTHER PUBLICATIONS

Baishakhi Mazumder, et al., Direct Solvothermal Synthesis of Early Transition Metal Nitrides; Inorganic Chemistry, vol. 47, No. 20, 2008, pp. 9684-9690, 2008 American Chemical Society Published on Web Sep. 19, 2008, XP55041257A.
Francois Cansell, et al., Supercritical fluid processing: a new route for materials synthesis; Journal of Materials Chemistry, J. Mater. Chem., 1999, 9, pp. 67-75, XP55041255A.
Hasegawa M., et al., Systematic study of formation and crystal structure of 3d-transition metal nitrides synthesized in a supercritical nitrogen fluid under 10 GPa and 1800K using diamond anvil cell and YAG laser heating; Journal of Alloys and Compounds, 403, 2005, pp. 131-142, XP027812183A.
Jacobs H, et al: Einkristallzuchtung von y'-Fe$_4$N in Uberkritischem Ammoniak; Journal of the Less-Common Metals, 134 (1987), pp. 215-220, XP026183774A, Elsevier Sequoia/Printed in the Netherlands. (English summary on 1st page of article).
Peters D., et al: Ammonothermal synthesis of aluminum nitride; Journal of Crystal Growth, 104, (1990) pp. 411-418, North Holland, Elsevier Science Publishers B. V. (North-Holland), XP27419868A.
Pietro Chirico, et al: Solvothermal synthesis of group 5 and 6 nitrides via reactions using LiNH$_2$ and ammonia nitrogen sources; Dalton Transactions, 2010; 39, pp. 6092-6097, XP55041398A.
Zajac M, et al. Ammonothermal synthesis of GaN doped with transition metal ions (Mn, Fe, Cr); Journal of Alloys and Compounds, 456 (2008), pp. 324-338, XP22590486A.
Zhou, Xiaoping; Study on the electrochemical behavior of vanadium nitride as a promising supercapacitor material; Journal of Physics and Chemistry of Solids; Journal of Physics and Chemistry of Solids 70 (2009), pp. 495-500.
U.S. Appl. No. 13/524,439 Office Action dated Nov. 13, 2013.
PCT/US2012/042689 International Search Report and Written Opinion, Oct. 25, 2012.
PCT/US2012/042679 International Search Report and Written Opinion, Oct. 15, 2012.
U.S. Appl. No. 13/524,439 Amendment filed Feb. 5, 2014.
PCT/US2012/042679 International Preliminary Report on Patentability and Written Opinion dated Jan. 7, 2014, 5 pages.
PCT/US2012/042689 International Preliminary Report on Patentability and Written Opinion dated Jan. 7, 2014, 7 pages.
Callahan, M., et al, "GaN single crystals grown on HVPE seeds in alkaline supercritical ammonia", A Novel Method of Advanced Materials Processing, J. Mater Sci, 41, (2006), pp. 1399-1407, Springer Science + Business Media, Inc.
Callahan, Michael J., et al, "Growth of GaN crystals under ammonothermal conditions", Mat. Res. Soc. Symp. Proc., vol. 798, 2004, Materials Research Society, pp. Y2.10.1-Y2.10.6.
Dwilinski, R. et al, "Ammono method of BN, AlN and GaN synthesis and crystal growth", MRS Internet Journal Nitride Semiconductor Research, 3, 25, (1998), pp. 1-4, The Materials Research Society.
Ehrentraut, Dirk, et al, "Reviewing recent developments in the acid ammonothermal crystal growth of gallium nitride", Journal of Crystal Growth, 310, (2008), pp. 3902-3906, Elsevier B.V.
Ehrentraut, Dirk, et al., "Technology of Gallium Nitride Crystal Growth", 2010 book, pp. 268-273, Springer Series in Materials Science.
Hashimoto, Tadao, et al, "Growth of gallium nitride via fluid transport in supercritical ammonia", Journal of Crystal Growth, 275, (2005), pp. e525-e530, Elsevier B.V.
Hashimoto, Tadao, et al, "Phase selection of Microcrystalline GaN synthesized in supercritical ammonia", Journal of Crystal Growth, 291, (2006), pp. 100-106, Elsevier B.V.
Hashimoto, Tadao, et al, "Status and perspectives of the ammonothermal growth of GaN substrates", Journal of Crystal Growth, vol. 310, Issue 5, (2008), pp. 876-880, ISSN 0022-0248, Elsevier B.V.
Jacobs, H., et al, "High-Pressure Ammonolysis in Solid-State Chemistry", Chapter 5, vol. 8, Current Topics in Materials Science, edited by E. Kaldis, pp. 383-427, North Holland Publishing Company, 1982.
Porowski, S., "Near defect free GaN substrates", MRS Proceedings, vol. 537, 1998, G1.3 doi:10.1557/PROC-537-G1.3, 12 pgs.
Purdy, Andrew P., et al, "Ammonothermal recrystallization of gallium nitride with acidic mineralizers", Crystal Growth & Design, vol. 2, No. 2, 2002, pp. 141-145, American Chemical Society.
Ramachandran, V., et al, "Inversion of wurtzite GaN (0001) by exposure to magnesium,", Applied Physics Letters, vol. 75, No. 6, 1999, pp. 808-810, American Institute of Physics.
Richter, Theresia, M.M., et al, "Chemistry of Ammonothermal Synthesis", Inorganics, 2, 2014, ISSN 2304-6740, pp. 29-78, MDPI, Basel, Switzerland, doi: 10.3390/inorganics2010029.
Wang, Buguo, et al, "Ammonothermal growth of GaN crystals in alkaline solutions", Journal of Crystal Growth, 287, (2006), pp. 376-380, Elsevier B.V.
Zajac, M., et al, "Possible origin of ferromagnetism in (Ga,Mn)N", AIP Journal of Applied Physics, vol. 93, No. 8, (2003), pp. 4715-4717, AIP Publishing, doi:10.1063/1.1559939.
EP12730334.5 Response to Communication Rule 161 and 162 EPC mailed Aug. 14, 2014, 11 pgs.
EP12731245.2 Response to Communication Rule 161 and 162 EPC mailed Aug. 14, 2014, 8 pgs.
U.S. Appl. No. 13/524,439 Notice of Allowance dated May 30, 2014.
U.S. Appl. No. 13/524,439 RCE and Amendment dated Sep. 2, 2014.
U.S. Appl. No. 13/524,439 Notice of Allowance dated Sep. 18, 2014.

* cited by examiner

SYNTHESIS METHOD OF TRANSITION METAL NITRIDE AND TRANSITION METAL NITRIDE

This application claims priority under 35 U.S.C. Sec. 119 (e) to U.S. app. 61/501,656 filed Jun. 27, 2011 with Tadao Hashimoto as inventor and entitled "SYNTHESIS METHOD FOR TRANSITION METAL NITRIDE AND TRANSITION METAL NITRIDE" and to U.S. app. 61/505,758 filed Jul. 8, 2011 with Tadao Hashimoto as inventor and entitled "ULTRA CAPACITORS USING VANADIUM NITRIDE-CONTAINING ELECTRODE AND SYNTHESIS METHOD OF TRANSITION METAL NITRIDE AND TRANSITION METAL NITRIDE." The contents of these patent applications are incorporated by reference herein as if put forth in full below.

BACKGROUND

1. Field of the Invention

The invention is related to transition metal nitrides and synthesis methods. The forms that the transition metal nitrides may take include thin film layers, micrometer-sized particles, and nanometer-sized particles. The applications include a thin film as a wear protective layer, particles for ultracapacitors, particles of catalysts, particles as an additive of a wear-resistant coating, and magnets.

2. Description of the Existing Technology and Some of its Problems

Transition metal nitride has been used as wear-resistant coatings and thermal barriers, due to its strong mechanical and thermal property. Along with the development of structural and mechanical engineering, the coatings and barriers are required to cover complicated and fine structures. In other words, the surface area relative to its volume is becoming larger in recent years.

It is also reported that transition metal nitride is useful as a functional material for ultracapacitors, catalysts, and magnets. To use transition metal nitride as ultracapacitor, catalysts, or magnets, it is important to increase surface area of the material. Nanotechnology using nano-sized particles has a potential of obtaining superior characteristics due to extremely large surface area relative to its weight. Functional materials requiring large surface area such as ultracapacitors, catalyst, and magnets receives tremendous benefit from nanotechnology.

With increasing demand of covering small-sized material with large surface area, the existing synthesis method is facing several challenges. Since transition metal is more readily oxidized than nitridized, synthesis of transition metal nitride requires elimination of oxygen and moisture. Synthesis methods typically involve vapor phase reaction in vacuum/air tight reactors. To form a nitride layer on transition metal parts, physical vapor deposition or plasma deposition are used. However, these methods are unable to coat complicated structure having deep blind holes because vapor phase reactant does not reach the bottom surface of the deep holes.

In the case of particle synthesis, vapor phase method is even less efficient because of extremely high surface area to cover. When the particles have size less than 10 nm or specific surface area larger than 10 $m^2/g$, it becomes challenging for the gaseous agents to cover the entire surface. For example, vanadium nitride nanoparticles are synthesized using $VCl_4$ as precursor. The $VCl_4$ is dissolved and stirred in anhydrous chloroform inside a glovebox. The solution is then transferred to an Ar-filled glove bag, where the dissolved chloride is reacted with anhydrous ammonia gas over solution for 8 hours. The as-prepared powder is collected by evaporating the solvent at 100° C. under continuous $NH_3$ gas flow. Final heat treatment for nitridization is conducted under an anhydrous ammonia atmosphere with a heating and cooling rate of 5° C./min. The temperature for heat treatment is 400° C. [1]. As shown in this example, the final heat treatment involves vapor phase reaction with constant ammonia flow at high temperature. A high temperature such as this can cause sintering, resulting in larger particle size than what would be achieved using a lower-temperature process.

The challenges in the existing synthesis methods of transition metal nitride are summarized as follows: (1) the existing methods use vapor phase reaction which is unable to cover surfaces of complicated structures or small particles; (2) the existing methods require constant flow of source gas such as ammonia or nitrogen; (3) some existing methods use metal halide precursors, which leaves halogen impurities unfavorable to ultracapacitor applications; (4) some existing methods requires multiple steps to obtain transition metal nitride; (5) some existing methods requires high temperature which causes larger particle size or unfavorable phase.

SUMMARY OF THE INVENTION

To overcome above-mentioned challenges, the present invention provides a new approach to achieve a cost-competitive synthesis method of transition metal nitrides. The present invention utilizes supercritical ammonia to nitridize transition metals. A source material containing transition metal is supplied to a high-pressure reactor together with ammonia and mineralizers. Mineralizers, which act as reducing agents, are selected from alkali metal, alkali earth metals or aluminum. Then, the reactor is heated at 132° C. or higher to attain supercritical condition of ammonia. The reactor is typically sealed to attain self-pressurization of ammonia upon heating, however; a semi-open reactor which allows additional feeding of source, mineralizer or ammonia is also usable. The high reactivity of mineralized supercritical ammonia is very effective to nitridize transition metals at lower temperature than conventional method, thereby producing e.g. catalyst particles of smaller particle size than processes that sinter particles at higher temperatures.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

A source material containing transition metal contains an amount of transition metal effective to accomplish a particular purpose. For instance, a substrate may be coated with a layer of transition metal that is to be converted to a nitride, so that the surface layer may be effective as a heat barrier or wear protective surface. Another example is that particles may contain an amount of a transition metal that, upon conversion to nitride, are catalytically active, will bear a certain amount of electrical charge when formed into an ultracapacitor, or shows sufficient magnetic property. The source material may contain more than 10 percent of transition metal by weight.

Technical Description of the Invention

The method of synthesizing transition metal nitrides in the current invention may utilize supercritical ammonia. Over the critical point of 132.4° C. and 11.28 MPa, ammonia becomes the supercritical condition, which is a state between liquid and gas. We found that supercritical ammonia with, optionally but desirably, a strong reducing mineralizer such as alkali metals, alkali earth metals or aluminum is capable of forming transition metal nitride.

This process may in one instance be a one-step process in a closed reactor and does not require constant flow of ammonia. By changing process temperature, pressure, mineralizer and time, the layer thickness or particle size is expected to be controlled from nano-scale to micron-scale. A batch process such as this may therefore enable all of the reaction materials to be placed into the high-pressure reactor and the product to be separated from the reactor after the reaction has concluded.

The process may in another instance be conducted with either constant flow of ammonia or with periodic addition of ammonia to the high-pressure reactor. A semi-batch process such as this may therefore allow some of the reaction materials such as the source material and optional mineralizer to be added to the reactor first and ammonia added either continuously or periodically during the reaction. Further, either source or mineralizer may instead or additionally be continuously or periodically added to the reactor during the reaction.

Figure 1:
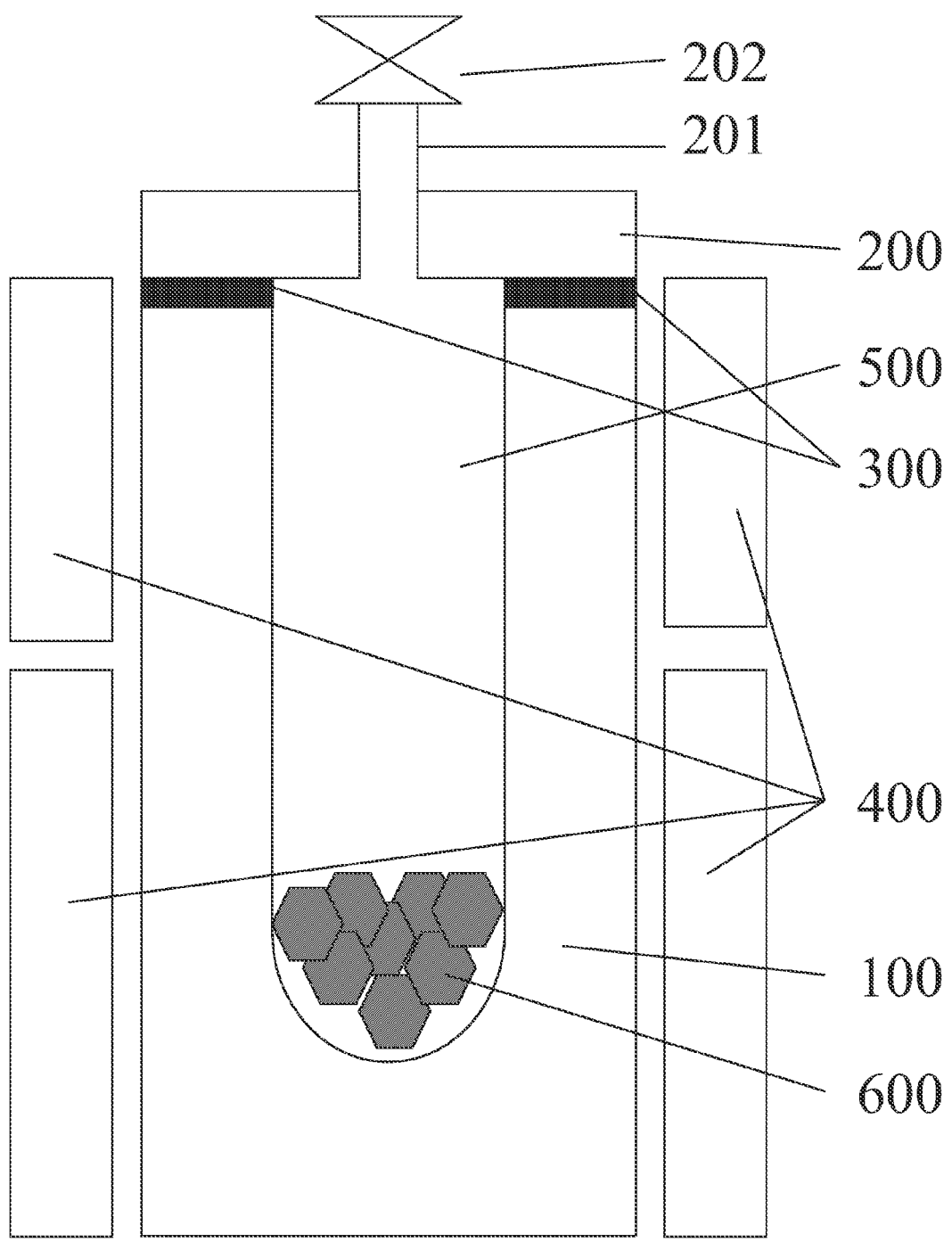
FIG. 1 is one construction of reactor.
100 High-pressure reactor
200 Lid of high-pressure reactor with gas inlet port
201 Gas inlet port
202 High-pressure valve
300 Gasket seal
400 External heater
500 Ammonobasic solution (ammonia with dissolved mineralizer)
600 Source material containing transition metal
Figure 2:
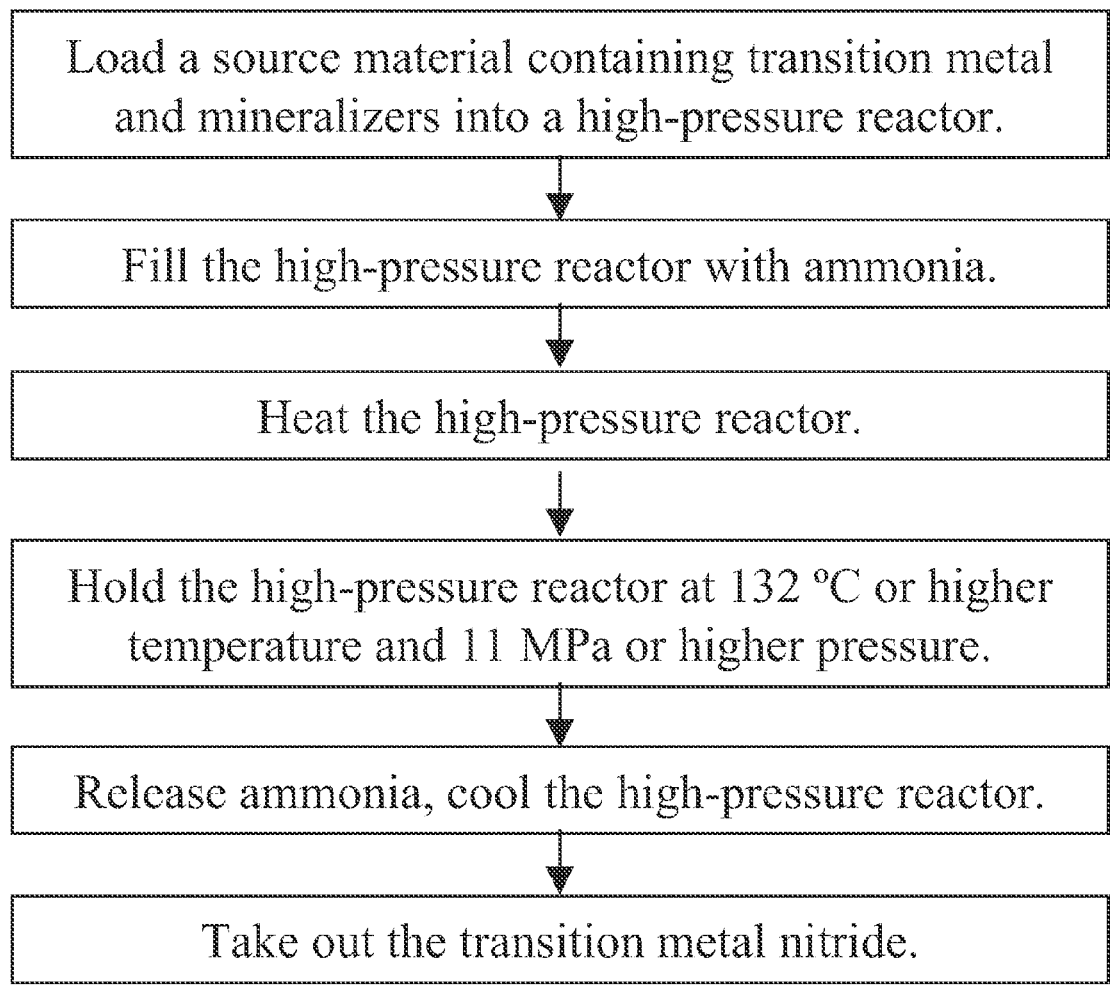
FIG. 2 is a standard process flow of current invention.

A standard process as diagramed in FIG. 2 is depicted in FIG. 1. A standard process as described uses high-pressure reactor 100. A source material containing transition metal 600 is placed in the high-pressure reactor 100 together with a mineralizer. Since mineralizer is highly reactive with oxygen, it is favorable to work in a glovebox filled with nitrogen or argon. The lid 200 has a gas inlet port 201 which is connected to a high-pressure valve 202. After charging the source material 600 and a mineralizer in the high-pressure reactor 100, the lid 200 is closed using a gasket 300 to prevent leaking of ammonia at high pressure. The high-pressure valve 202 is also closed. Then, the high-pressure reactor 100 is taken out of the glovebox and the high-pressure valve 202 is connected to a gas/vacuum line. The high-pressure reactor 100 is pumped through the gas inlet port 201 by opening the high-pressure valve 202. After attaining sufficient vacuum level, the high-pressure reactor 100 is externally chilled with liquid nitrogen and filled with gaseous ammonia through the gas inlet port 201. The gaseous ammonia is condensed to the liquid phase in the high-pressure reactor 100. After filling predetermined amount of liquid ammonia, the high-pressure valve 202 is closed and disconnected from the gas/vacuum line. The high-pressure reactor 100 is transferred to a furnace and externally heated. Since the high-pressure reactor 100 is sealed, it is self pressurized with heated ammonia and the ammonia reaches supercritical condition. The mineralizer is dissolved in ammonia creating ammonobasic solution 500. The source material containing transition metal 600 inside the high-pressure reactor 100 is nitridized with the ammonobasic solution 500. After predetermined time, the ammonia is released by opening the high-pressure valve 202. The transition metal nitride is taken out of the high-pressure reactor 100 after the high-pressure reactor 100 is cooled. The transition metal nitride is rinsed with water to remove mineralizers. The last step creates a thin oxide layer on the top surface of the transition metal nitride.

Mineralizer can be selected based on the metal nitride to synthesize. Sodium metal is commonly used, but if higher reactivity is needed, one may choose potassium-based mineralizer. Conversely, if milder reactivity is favored one may choose lithium-based mineralizers. If even milder reactivity is favored, magnesium or calcium based mineralizers may be selected. Also, if removal of oxygen is the primary purpose of mineralizer, metallic calcium, aluminum or magnesium may be suited for a mineralizer. Mixture of there materials may also be used to control the reaction.

Example 1

A vanadium foil of approximately 13 mm in diameter and 2.6 g of Na were placed in a high-pressure reactor having an internal volume of 127 cc in a glove box in which the oxygen and moisture concentration is regulated below 0.1 ppm. Then, the high-pressure reactor was sealed and nitrogen in the reactor was evacuated with turbo molecular pump through a gas inlet port. After pumping the reactor to less than $10^{-6}$ mbar, the reactor was chilled by immersing it in liquid nitrogen and gaseous anhydrous ammonia was introduced in the reactor through the gas inlet port. Approximately 43.7 g of liquid anhydrous ammonia was condensed in the reactor. The sealed reactor was then transferred to a furnace and heated at 530~535° C. for 5 days. The resulting pressure was 167 MPa (24,170 psi). After the process, the vanadium foil showed goldish color, indicating the surface of the vanadium foil was nitridized. When yellowish $V_2O_5$ powders were used instead of the foil, blackish powder, which is expected to be VN, were obtained.

Example 2

Similar experiment as example 1 was conducted for molybdenum and titanium, and confirmed color change in of these metals.

Example 3

Similar experiment as example 1 is conducted with a high-pressure reactor having gas inlet port and high-pressure valve. During the process, pressurized ammonia is supplied to supplement ammonia consumed during the process.

Example 4

Using similar high-pressure reactor, vanadium-containing tools or parts are coated with transition metal nitride by nitridizing the surface of the metal. Also, these tools or parts are coated with metallic vanadium prior to the ammonothermal process to form thicker protective layer of transition metal nitride.

Example 5

A high-pressure reactor has the following particles placed in it sequentially along with a mineralizer and ammonia:

niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel. The reactor is heated, and the ammonia is placed in supercritical state within the high-pressure reactor. The respective niobium nitride, tin nitride, indium nitride, platinum nitride, tantalum nitride, zirconium nitride, copper nitride, iron nitride, tungsten nitride, chromium nitride, molybdenum nitride, hafnium nitride, titanium nitride, vanadium nitride, cobalt nitride, manganese nitride, cerium nitride, mercury nitride, plutonium nitride, gold nitride, silver nitride, iridium nitride, palladium nitride, yttrium nitride, ruthenium nitride, lanthanum nitride, cerium nitride, praseodymium nitride, neodymium nitride, promethium nitride, samarium nitride, europium nitride, gadolinium nitride, terbium nitride, dysprosium nitride, holmium nitride, erbium nitride, thulium nitride, ytterbium nitride, lutetium nitride and nickel nitride nanoparticles are obtained. Desired phase such as $Fe_{16}N_2$ of iron nitride, which is useful for magnet applications, could be obtained by adjusting process temperature, pressure, time, etc.

In view of the above, non-limiting examples of what are disclosed are:

1. A method of synthesizing a nitride of a transition metal or transition metal alloy comprising:
   (a) Supplying one or more source materials containing one or more transition metals in a reactor;
   (b) Supplying ammonia in the reactor;
   (c) Optionally supplying a mineralizer which enhances the reaction between the source material and the ammonia;
   (d) Heating the reactor to attain supercritical condition of the ammonia.
2. A method of synthesizing a nitride of transition metal or transition metal alloy according to paragraph 1, wherein the mineralizer contains at least one selected from Li, Na, K, Ca, Mg and Al.
3. A method of synthesizing a nitride of a transition metal or transition metal alloy according to paragraph 1 or paragraph 2, wherein the reactor is made of Ni—Cr based alloy.
4. A method of synthesizing a nitride of a transition metal or transition metal alloy according to any of paragraphs 1-3, wherein the reactor is heated to a temperature of 132° C. or higher.
5. A method of synthesizing a nitride of a transition metal or transition metal alloy according to any of paragraphs 1-4, wherein the reactor is a batch reactor which is sealed and self pressurized with heated ammonia.
6. A method of synthesizing a nitride of a transition metal or transition metal alloy according to any of paragraphs 1-4, wherein the reactor is a semi-batch reactor which enables supply of the source material, the ammonia, or the mineralizer or exhaust of gas, products, or byproducts during the synthesis.
7. A method of synthesizing a nitride of a transition metal or transition metal alloy according to any of paragraphs 1-6, wherein the transition metal is V.
8. A method of synthesizing a nitride of a transition metal or transition metal alloy according to any of paragraphs 1-7, wherein the source material is metallic vanadium, vanadium oxide, vanadium pentoxide, ammonium metavanadate, or a mixture of one or more thereof.
9. A method according to any of paragraphs 1-8 wherein the transition metal nitride does not incorporate a substantial amount of the mineralizer into the transition metal nitride.
10. Vanadium nitride particles synthesized by a method of any of paragraphs 1-9, wherein the particle size is less than 10 nm.
11. Vanadium nitride particles according to paragraph 10 or as synthesized by a method of any of paragraphs 1-9, wherein the specific surface area of the particles is greater than 10 $m^2/g$.
12. Vanadium nitride particles of any of paragraphs 10-11, wherein the surface of the particles is oxidized.
13. Vanadium nitride particles of any of paragraphs 10-12, wherein the particles do not contain halogen impurities.
14. Nitride particles of transition metal or transition metal alloy synthesized by a method according to any of paragraphs 1-9, wherein the particle size is less than 10 nm.
15. Nitride particles according to paragraph 14 or as synthesized by a method according to any of paragraphs 1-9, wherein the specific surface area of the particles is greater than 10 $m^2/g$.
16. Nitride particles of transition metal or transition metal alloy of any of paragraphs 14-15, wherein the surface of the particles is oxidized.
17. Nitride particles of transition metal or transition metal alloy of any of paragraphs 14-16, wherein the particles do not contain halogen impurities.
18. A compound having particles as specified in any of paragraphs 10-17 or as made by a method of any of paragraphs 1-9 wherein the compound comprises a nitride of a single transition metal and not a nitride of a non-transition element and a transition metal element together as one compound.

Advantages and Improvements

The present invention discloses a new method of producing transition metal nitride having one or more of the following advantages:

1) Highly cost-competitive due to closed reactor system.
2) Capable of forming nitride layer on surfaces of complicated structure due to high reactivity of supercritical ammonia.
3) Capable of forming nitride particles due to high reactivity of supercritical ammonia.
4) Free from unfavorable impurities such as halogens.
5) Capable of selecting desired phase, particularly low-temperature phase, which is difficult to obtain in other high-temperature process.

REFERENCES

All references discussed in the application are incorporated by reference herein,
[1] D. Choi, G. E. Blomgren, and P. N. Kumta, Advanced Materials 18 (2006) pp. 1178.

CONCLUSION

This concludes the description of preferred embodiments of the invention. The following describes some alternative embodiments for accomplishing the present invention.

Although the examples describe a method of synthesizing vanadium nitride, molybdenum nitride and titanium nitride, other transition metal nitrides such as iron nitride, chromium nitride, scandium nitride, zirconium nitride can be synthesized with the same method. Also, alloy of transition metal nitrides can be synthesized with the same method.

Although the examples describe synthesis of foil of vanadium nitride, molybdenum nitride, and titanium nitride, other forms of transition metal nitrides such as nanocrystalline particles, microcrystalline particles, thin layers, and bulk single crystals can be produced with the same method.

Although the examples describe a synthesis method using Na as a mineralizer, other alkali metal, alkali earth metal or aluminum can be used as a mineralizer. Also, mixture of two or more mineralizers can be used.

Although the preferred embodiment describes a synthesis method in a specific temperature and pressure, other temperature and pressure setting can be used as long as the ammonia is in the supercritical condition.

Although the preferred embodiment describes a synthesis method using high-pressure reactor of a specific shape, other types of high-pressure reactor such as one with two lids, one with external high-pressure pump, one with high-pressure inlet port which enables constant feeding of source, mineralizer or ammonia can be used.

The method may be particularly useful in forming a nitride of a single transition metal (and particularly a relatively pure form of such a nitride) such as e.g. vanadium nitride, molybdenum nitride, titanium nitride, or iron nitride or an alloy of such nitrides rather than a nitride of a non-transition element and a transition metal element together as one compound.

What is claimed is:

1. A method of synthesizing a nitride of a transition metal or transition metal alloy comprising:
    (a) supplying at least one source material containing one or more transition metals in a reactor;
    (b) supplying ammonia in the reactor;
    (c) supplying a mineralizer which enhances the reaction between the source material and the ammonia under reaction conditions; and
    (d) heating the reactor to attain supercritical condition of the ammonia to form transition metal nitride.

2. A method of synthesizing a nitride of transition metal or transition metal alloy according to claim 1, wherein the mineralizer contains at least one member selected from the group consisting of Li, Na, K, Ca, Mg and Al.

3. A method of synthesizing a nitride of a transition metal or transition metal alloy according to claim 1, wherein the reactor is made of Ni—Cr based alloy.

4. A method of synthesizing a nitride of a transition metal or transition metal alloy according to claim 1, wherein the reactor is heated to a temperature of 132° C. or higher.

5. A method of synthesizing a nitride of a transition metal or transition metal alloy according to claim 1, wherein the reactor is a batch reactor which is sealed and self pressurized with heated ammonia.

6. A method of synthesizing a nitride of a transition metal or transition metal alloy according to claim 1, wherein the reactor is a semi-batch reactor which enables supply of the source material, the ammonia, or a mineralizer or enables exhaust of gas, products, or byproducts during the synthesis.

7. A method of synthesizing a nitride of a transition metal or transition metal alloy according to claim 1, wherein the transition metal is V.

8. A method of synthesizing a nitride of a transition metal or transition metal alloy according to claim 1, wherein the source material comprises metallic vanadium, vanadium oxide, vanadium pentoxide, ammonium metavanadate, or a mixture of one or more thereof.

9. A method of synthesizing a nitride of transition metal or transition metal alloy according to claim 1, wherein at least a portion of the source material consists essentially of a metal.

10. A method of synthesizing a nitride of transition metal or transition metal alloy according to claim 1, wherein the source material does not comprise a metal halide.

11. Vanadium nitride particles synthesized according to a method of claim 1, wherein the source material of said method is a metal or a metal-compound precursor other than a metal halide such that the resultant vanadium nitride particles do not contain halogen impurities and wherein the particle size is less than 10 nm.

12. Vanadium nitride particles of claim 11, wherein the specific surface area of the particles is greater than 10 m$^2$/g.

13. Vanadium nitride particles of claim 11, wherein the surface of the particles is oxidized.

14. Nitride particles of transition metal or transition metal alloy synthesized according to a method of claim 1, wherein the source material of said method is a metal or a metal-compound presursor other than a metal halide so that the resultant nitride particles do not contain halogen impurities and wherein the particle size is less than 10 nm.

15. Nitride particles of claim 14, wherein the specific surface area of the particles is greater than 10 m$^2$/g.

16. Nitride particles of claim 14, wherein the surface of the particles is oxidized.

17. A compound as made by a method of claim 1 wherein the compound comprises a nitride of a single transition metal and not a nitride of a non-transition element and a transition metal element together as one compound and wherein the source material of said method is a metal or a metal-compound precursor other than a metal halide such that the resultant compound does not contain halogen impurities.

* * * * *